United States Patent
Minokuchi et al.

(10) Patent No.: US 12,022,380 B2
(45) Date of Patent: Jun. 25, 2024

(54) NETWORK NODE AND USER EQUIPMENT THAT INITIATE A CONNECTION

(71) Applicant: NTT DOCOMO, INC., Tokyo (JP)

(72) Inventors: Atsushi Minokuchi, Tokyo (JP); Srisakul Thakolsri, Munich (DE); Malla Reddy Sama, Munich (DE); Alf Zugenmaier, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 429 days.

(21) Appl. No.: 17/421,252

(22) PCT Filed: Jan. 7, 2020

(86) PCT No.: PCT/JP2020/000176
§ 371 (c)(1),
(2) Date: Jul. 7, 2021

(87) PCT Pub. No.: WO2020/145273
PCT Pub. Date: Jul. 16, 2020

(65) Prior Publication Data
US 2022/0078700 A1    Mar. 10, 2022

(30) Foreign Application Priority Data
Jan. 11, 2019    (JP) .............................. 2019-003834

(51) Int. Cl.
| | |
|---|---|
| *H04W 48/14* | (2009.01) |
| *H04W 48/02* | (2009.01) |
| *H04W 48/12* | (2009.01) |
| *H04W 48/16* | (2009.01) |
| *H04W 48/18* | (2009.01) |

(Continued)

(52) U.S. Cl.
CPC .......... *H04W 48/14* (2013.01); *H04W 48/02* (2013.01); *H04W 48/12* (2013.01); *H04W 48/16* (2013.01); *H04W 48/18* (2013.01); *H04W 60/04* (2013.01); *H04W 60/06* (2013.01)

(58) Field of Classification Search
CPC ..... H04W 48/14; H04W 48/02; H04W 48/12; H04W 60/04; H04W 48/18; H04W 48/16; H04W 60/06
See application file for complete search history.

(56) References Cited

U.S. PATENT DOCUMENTS

2021/0297937 A1*   9/2021   Baek ..................... H04W 48/12

OTHER PUBLICATIONS

3GPP TR 23.734 V16.0.0, Study on enhancement of 5GS for Vertical and LAN Services V16.0.0 (Release 16), pp. 16, 25 (Year: 2018).*

(Continued)

*Primary Examiner* — Jackie Zuniga Abad
(74) *Attorney, Agent, or Firm* — Osha Bergman Watanabe & Burton LLP

(57) ABSTRACT

A network node includes a receiver configured to receive, from a user equipment, a message requesting an initial registration or a location registration from a user equipment; and a transmitter configured to transmit a message to the user equipment when the user equipment is disallowed to connect to any one of one or more network slices, the message allowing the initial registration or the location registration including information related to a connection restriction that causes the user equipment to transition into a state in which the user equipment is registered and the user equipment is not allowed to use a service.

2 Claims, 5 Drawing Sheets

(51) Int. Cl.
*H04W 60/04* (2009.01)
*H04W 60/06* (2009.01)

(56) References Cited

OTHER PUBLICATIONS

Extended European Search Report issued in counterpart European Patent Application No. 20738384.5, mailed on Sep. 5, 2022 (12 pages).
3GPP TS 24.501 V15.2.1; "3rd Generation Partnership Project; Technical Specification Group Core Network and Terminals; Non-Access-Stratum (NAS) protocol for 5G System (5GS); Stage 3 (Release 15)"; Jan. 2019 (455 pages).
Nokia, Nokia Shanghai Bell; "5GMM cause value for CAG"; 3GPP TSG-CT WG1 Meeting #117, C1-193510; Reno (NV), USA; May 13-17, 2019 (24 pages).
SA WG2 Meeting #129bis; S2-1812403 "KI#3: Update to Solution 3.3 on (re-)authentication after failure/revocation" Motorola Mobility, Lenovo; West Palm Beach, Florida; Oct. 25-30, 2018 (4 pages).
SA WG2 Meeting #127; S2-183293 "Clarification on UE behavior on receiving empty Allowed NSSAI" Intel; Sanya, China; Apr. 16-20, 2018 (7 pages).
3GPP TS 23.501 V15.3.0 "3rd Generation Partnership Project; Technical Specification Group Services and System Aspects; System Architecture for the 5G System; Stage 2 (Release 15)" Sep. 2018 (226 pages).
International Search Report issued in International Application No. PCT/JP2020/000176, mailed Mar. 3, 2020 (4 pages).
Written Opinion issued in International Application No. PCT/JP2020/000176; Dated Mar. 3, 2020 (3 pages).
Office Action issued in corresponding Japanese Application No. 2020-565157, dated May 23, 2023 (5 pages).
Office Action issued in counterpart Chinese Application No. 202080008171.2, dated Sep. 27, 2023 (15 pages).

* cited by examiner

NETWORK NODE AND USER EQUIPMENT THAT INITIATE A CONNECTION

TECHNICAL FIELD

The present invention relates to a network node and a user equipment in a communication system.

BACKGROUND ART

In 3GPP (3rd Generation Partnership Project), in order to realize a further increase in system capacity, a further increase in the data transmission speed, and further reduction of latency in a radio section, studies are being made with respect to a radio communication method referred to as 5G or New Radio (NR) (hereinafter, the radio communication method is referred to as "5G" or "NR"). In 5G, various radio technologies are being studied, in order to satisfy the requirement of reducing the latency in the radio section to be less than or equal to 1 ms while achieving a throughput of 10 Gbps or more.

In NR, studies are being made with respect to a network architecture including 5G Core Network (5GC) corresponding to Evolved Packet Core (EPC) that is the core network in the network architecture of Long Term Evolution (LTE), and Next Generation-Radio Access Network (NG-RAN) corresponding to Evolved Universal Terrestrial Radio Access Network (E-UTRAN) that is Radio Access Network (RAN) in the network architecture of LTE (for example, Non-Patent Document 1).

RELATED ART DOCUMENT

Non-Patent Document

Non-Patent Document 1: 3GPP TS 23.501 V15.3.0 (2018 September)

SUMMARY OF THE INVENTION

Problem to be Solved by the Invention

In a 5G system, if a user equipment that can be connected to only a private network slice is to be developed, it is assumed that the user equipment attempts to connect to another network slice when the private network slice becomes unavailable for some reason.

The present invention has been made in view of the point described above, and an object is to control an operation to initiate a connection to a network by a user equipment.

Means for Solving the Problem

According to a disclosed technology, there is provided a network node including a receiver configured to receive, from a user equipment, a message requesting an initial registration or a location registration from a user equipment; and a transmitter configured to transmit a message to the user equipment when the user equipment is disallowed to connect to any one of one or more network slices, the message allowing the initial registration or the location registration including information related to a connection restriction that causes the user equipment to transition into a state in which the user equipment is registered and the user equipment is not allowed to use a service.

Advantage of the Invention

According to the disclosed technology, an operation to initiate a connection to a network by a user equipment can be controlled.

EMBODIMENTS OF THE INVENTION

Embodiments of the present invention will be described below with reference to the drawings. Note that the embodiments described below are merely examples, and embodiments to which the present invention is applied are not limited to the following embodiments.

In operations of a radio communication system according to the embodiment of the present invention, the existing technology is used as appropriate. The existing technology is, for example, existing LTE; however, the existing technology is not limited to existing LTE. Furthermore, the term "LTE" used in the present specification has a wide meaning including LTE-Advanced and LTE-Advanced or beyond (for example, NR), or wireless Local Area Network (LAN), unless otherwise specified.

Furthermore, in the embodiment of the present invention, the radio parameter or the like being "configured" means that a predetermined value is "pre-configured", or a radio parameter, which is reported from a network node 10 or a user equipment 20, is configured.

Figure 1:
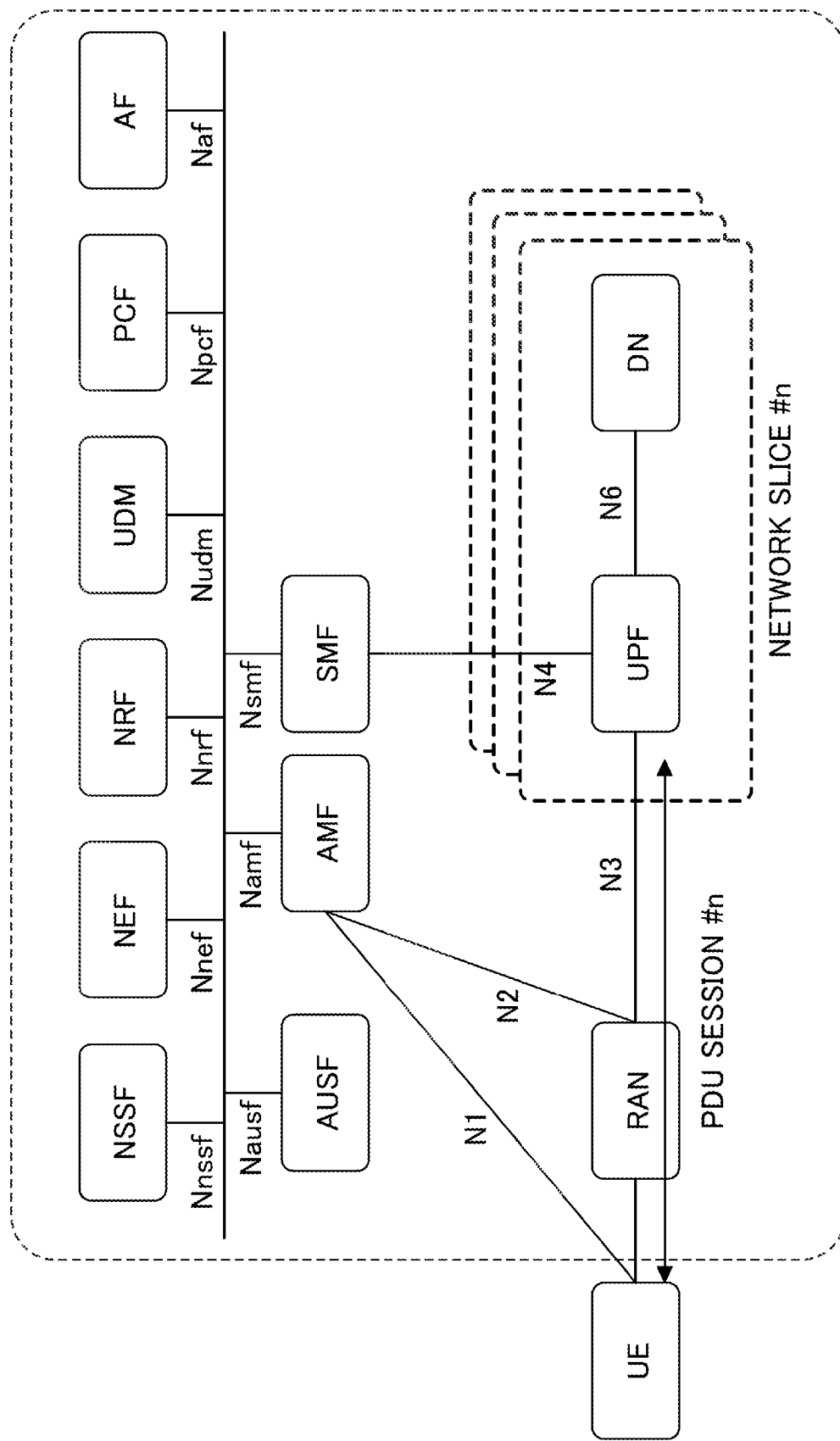
FIG. 1 is a diagram for illustrating a communication system according to an embodiment of the present invention.

FIG. 1 is a diagram for describing a communication system according to an embodiment of the present invention. As illustrated in FIG. 1, the communication system is formed of a UE, which is the user equipment 20, and a plurality of network nodes 10. Hereinafter, it is assumed that one network node 10 corresponds to each function; however, one network node 10 may implement a plurality of functions, or a plurality of network nodes 10 may implement one function. Furthermore, the "connection" described below may be a logical connection or a physical connection.

The RAN (Radio Access Network) is the network node 10 having a radio access function, and is connected to the UE, the AMF (Access and Mobility Management Function), and the UPF (User Plane Function). The AMF is the network node 10 having functions such as termination of a RAN interface, termination of NAS (Non-Access Stratum), registration management, connection management, reachability management, and mobility management, etc. The UPF is the network node 10 having functions such as a PDU (Protocol Data Unit) session point for external interconnection with a DN (Data Network), packet routing and forwarding, and QoS (Quality of Service) handling of a user plane, etc. The UPF and the DN constitute a network slice. In the radio communication network according to the embodiment of the present invention, a plurality of network slices are constructed.

The AMF is connected to UE, RAN, Session Management function (SMF), Network Slice Selection Function (NSSF), Network Exposure Function (NEF), Network Repository Function (NRF), Authentication Server Function (AUSF), Policy Control Function (PCF), and Application Function (AF). AMF, SMF, NSSF, NEF, NRF, AUSF, PCF, and AF, are the network nodes 10 that are connected to each other via interfaces based on the respective services, Namf, Nsmf, Nnssf, Nnef, Nnrf, Nausf, Npcf, and Naf.

The SMF is the network node 10 having functions such as managing a session, allocating and managing an IP (Internet Protocol) address of the UE, a Dynamic Host Configuration Protocol (DHCP) function, an Address Resolution Protocol (ARP) proxy, and a roaming function. The NEF is the network node 10 having a function of reporting capabilities and events to another Network Function (NF). The NSSF is the network node 10 having functions such as selecting a network slice to which the UE connects, determining permitted Network Slice Selection Assistance Information (NSSAI), determining NSSAI to be configured, and determining an AMF set to which the UE connects. The PCF is the network node 10 having a function of performing network policy control. The AF is the network node 10 having the function of controlling the application server.

Here, when a Public Land Mobile Network (PLMN) provides a company with a closed area network with a private network slice using a 5G system and the company is to operate an industrial Internet of Things (IoT) terminal in a factory, a control is required such that the industrial IoT terminal is allowed to connect only to the private network slice and the industrial IoT terminal is disallowed to connect to a public network.

When subscriber information is changed due to an operation change on a user side or the like, for example, it is assumed that a terminal dedicated to a private network slice, such as the above-described industrial IoT terminal, becomes unable to connect to the private network slice and that the terminal is in a state in which all network slices are unusable. When the terminal dedicated to the private network slice is unable to connect to any of the network slices, the terminal may attempt to connect to a network slice of a default public network. From a user's point of view, the connection is to be limited only to the private network slice because the terminal is used as the terminal dedicated to the private network slice. That is, when the terminal dedicated to the private network slice becomes unable to connect to any of the network slices, the terminal is to be controlled so that the terminal does not attempt to connect to, for example, a network slice of a default public network or another PLMN.

Thus, when the UE 20 that is operated as the terminal dedicated to the private network slice is unable to connect to any of the network slices, a 5G System Mobility Management (5GMM) sublayer state is transitioned to 5GMM-REGISTERED, and furthermore, a substrate of the state 5GMM-REGISTERED is transitioned to 5GMM-REGISTERED.NON-ALLOWED-SERVICE. A state in which the 5GMM sublayer state is 5GMM-REGISTERED means that 5GMM context is established. For example, when the UE 20 is camped on a cell in an unallowed tracking area, the 5GMM sublayer state and the substrate of the 5GMM sublayer state are transitioned to 5GMM-REGISTERED.NON-ALLOWED-SERVICE.

Figure 2:
FIG. 2 is a sequence diagram for illustrating a registration procedure according to an embodiment of the present invention.

FIG. 2 is a sequence diagram for illustrating a registration procedure according to an embodiment of the present invention. In order to cause the UE 20 to transition to 5GMM-REGISTERED.NON-ALLOWED-SERVICE in response to a desired trigger, "Information Element (IE) that suggests access to a public network is restricted and only access to a private network slice is allowed" is newly defined. The IE may be transmitted from AMF 10 to the UE 20 by a NAS message "REGISTRATION ACCEPT."

In step S11 illustrated in FIG. 2, the UE 20 transmits "REGISTRATION REQUEST" to the AMF 10. "REGISTRATION REQUEST" is a NAS message transmitted when requesting an initial registration or a location registration. Next, the AMF 10 transmits "REGISTRATION ACCEPT" including "IE that suggests access to a public network is restricted and only access to a private network slice is allowed" to the UE 20 (S12). The AMF 10 may transmit "REGISTRATION ACCEPT" including "IE that suggests access to a public network is restricted and only access to a private network slice is allowed" based on a result of determining whether the UE 20 can connect only to a Closed Access Group (CAG) cell. Additionally, the AMF 10 may transmit "REGISTRATION ACCEPT" including "IE that suggests access to a public network is restricted and only access to a private network slice is allowed" when there is no network slice to be configured in the allowed Network Slice Selection Assistance Information (NSSAI) indicating a network slice to be allowed to be connected in the PLMN, that is, when the UE 20 is unable to connect to any of the network slices. Subsequently, the UE 20 transmits "REGISTRATION COMPLETE" to the AMF 10 (S13).

Figure 3:
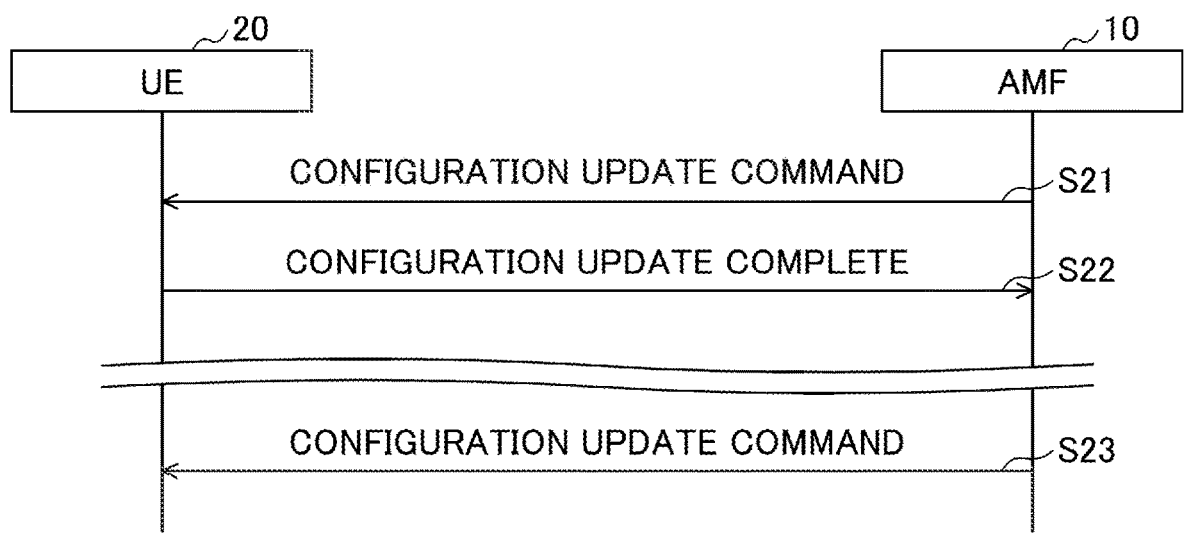
FIG. 3 is a sequence diagram for illustrating a UE configuration updating procedure according to an embodiment of the present invention.

FIG. 3 is a sequence diagram for illustrating a UE configuration updating procedure according to the embodiment of the present invention. The "IE that suggests access to a public network is restricted and only access to a private network slice is allowed" may be transmitted from the AMF 10 to the UE 20 by a NAS message "CONFIGURATION UPDATE COMMAND."

In step S21, the AMF 10 transmits a "CONFIGURATION UPDATE COMMAND" including the "IE that suggests access to a public network is restricted and only access to a private network slice is allowed" to the UE 20. Next, the UE 20 transmits CONFIGURATION UPDATE COMPLETE to the AMF 10 (S22).

As another example, as in step S23, the sequence may alternatively be completed only by the AMF 10 transmitting "CONFIGURATION UPDATE COMMAND" including the "IE that suggests access to a public network is restricted and only access to a private network slice is allowed" to the UE 20.

Figure 4:
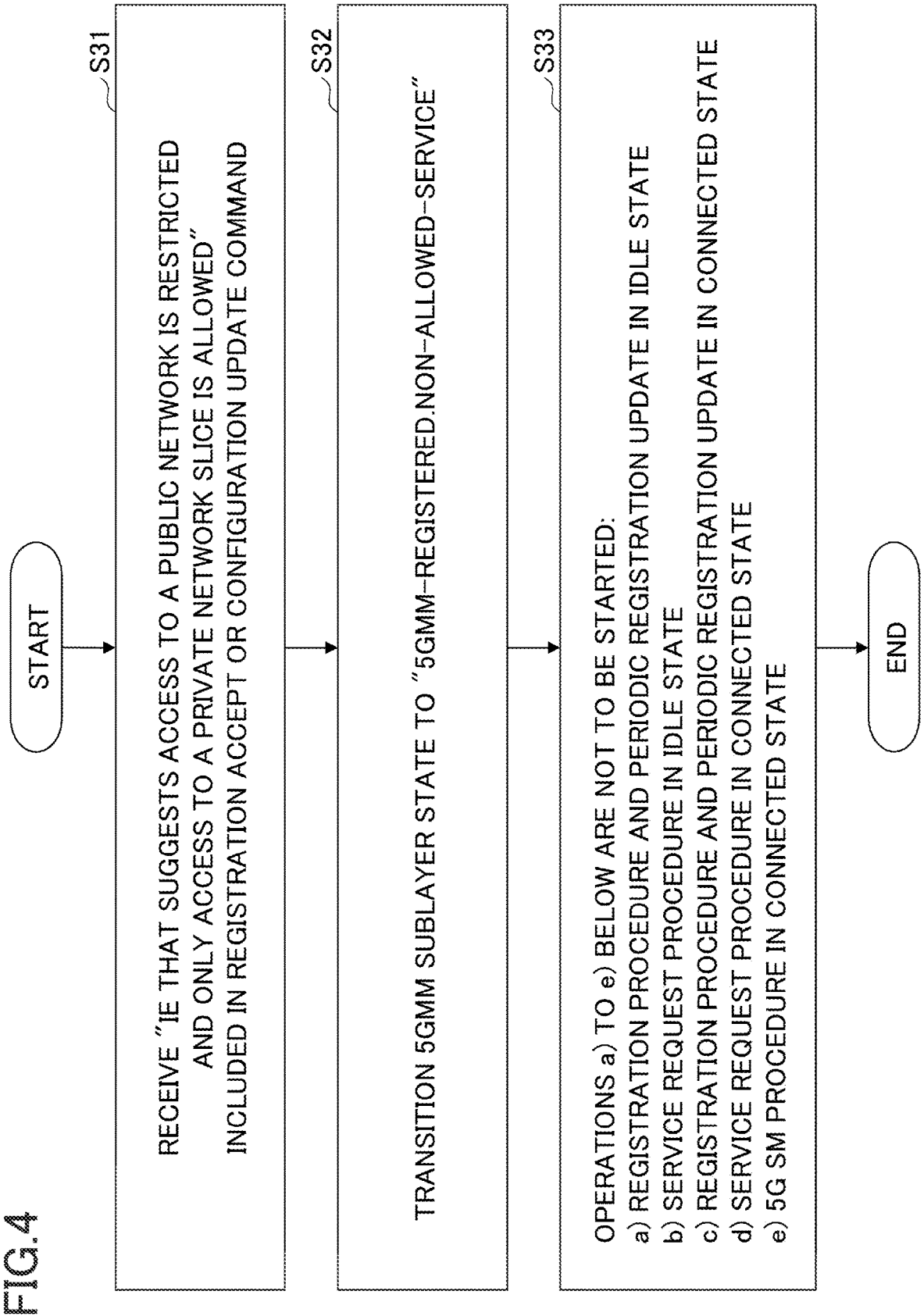
FIG. 4 is a flowchart for illustrating a UE operation according to an embodiment of the present invention.

FIG. 4 is a flowchart for describing a UE operation according to an embodiment of the present invention. An operation performed when the UE 20 receives the "IE that suggests access to a public network is restricted and only access to a private network slice is allowed" illustrated in FIG. 2 or FIG. 3 is described below.

In step S31, the UE 20 receives the "IE that suggests access to a public network is restricted and only access to a private network slice is allowed" included in "REGISTRATION ACCEPT" or "CONFIGURATION UPDATE COM- MAND". Next, the UE20 transitions the 5GMM sublayer state to "5GMM-REGISTERED.NON-ALLOWED-SERVICE" (S32).

As illustrated in step S33, the UE 20 does not start operations of a) to e) below.
   a) Registration procedure and periodic registration update in an idle state
   b) Service request procedure in an idle state
   c) Registration Procedure and periodic registration update in a connected state
   d) Service request procedure in a connected state
   e) 5G System Session Management (SM) procedure in a connected state As illustrated in FIG. 4, the 5GMM sublayer state can be transitioned to "5GMM-REGISTERED.NON-ALLOWED-SERVICE" in response to a desired trigger. Additionally, the operation of step S33 can prevent the UE 20 from starting to connect to the default network slice of the public network in the PLMN even when the UE 20 is unable to connect to the private network slice. Additionally, the UE20 does not search for another PLMN because the registration procedure is not denied by "REGISTRATION REJECT" and the UE20 is in the state "5GMM-REGISTERED". Furthermore, even in the "5GMM-REGISTERED.NON-ALLOWED-SERVICE," a control signal can be transmitted from a network to the UE 20, so that the UE 20 can be controlled from the network as needed.

The embodiment described above can prevent the UE 20 from starting to connect to the public network in the PLMN and to another PLMN, even if the UE 20 cannot connect to the private network slice.

That is, an operation to initiate a connection to a network by a user equipment can be controlled.

(Device Configuration)

Next, a functional configuration example of the network node 10 and the user equipment 20 that execute the above-described processes and operations will be described. The network node 10 and the user equipment 20 include functions for implementing the above-described embodiments. However, each of the network node 10 and the user equipment 20 may have only some of the functions of the embodiments.

<Network Node 10>

Figure 5:
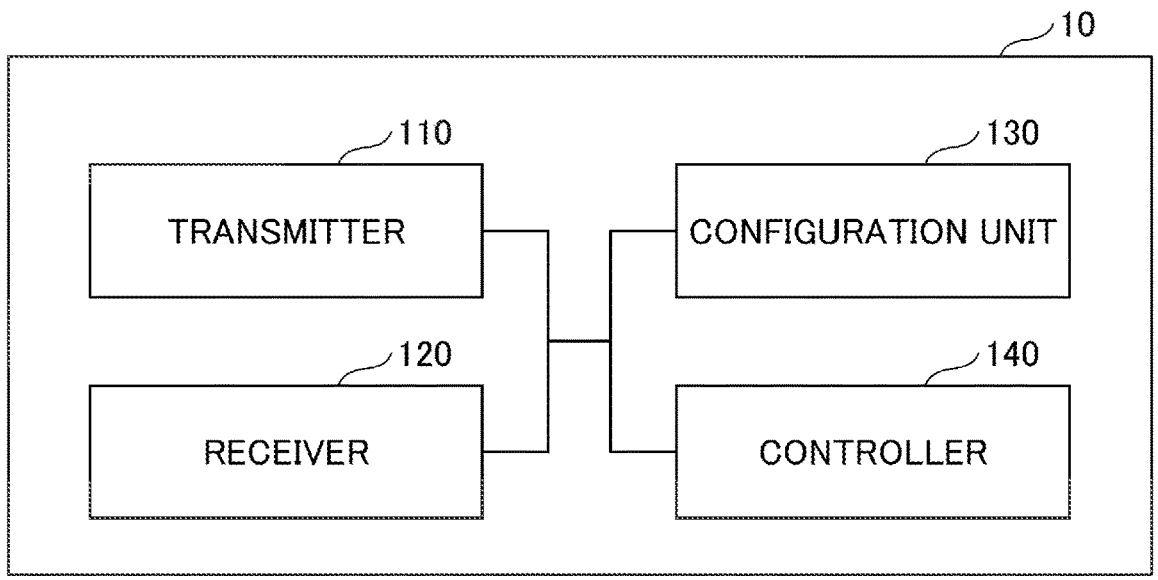
FIG. 5 is a diagram illustrating an example of a functional configuration of a network node 10 according to an embodiment of the present invention.

FIG. 5 is a diagram illustrating an example of a functional configuration of the network node 10. As illustrated in FIG. 5, the network node 10 includes a transmitting unit 110, a receiving unit 120, a configuration unit 130, and a control unit 140. The functional configuration illustrated in FIG. 5 is only an example. As long as the operations according to the embodiment of the present invention can be executed, the functional division and the name of the functional unit may be any functional division and name. Furthermore, the network node 10 having a plurality of different functions on the system architecture may be configured by a plurality of the network nodes 10 separated for each function.

The transmitting unit 110 includes a function of generating signals to be transmitted to the user equipment 20 or another network node 10, and transmitting the signals in a wired or wireless manner. The receiving unit 120 includes a function of receiving various signals transmitted from the user equipment 20 or another network node 10, and acquiring, for example, information of a higher layer from the received signals.

The configuration unit 130 stores pre-configured configuration information and various types of configuration information to be transmitted to the user equipment 20 in a storage device, and reads these pieces of information from the storage device as necessary. The content of the configuration information is, for example, information on a network slice that is allowed to be connected to by the user equipment 20.

As described in the embodiment, the control unit 140 performs processing related to an initial registration or a location registration including access control of the user equipment 20. Furthermore, the control unit 140 performs processing related a modification of a configuration of the user equipment 20. A functional unit related to signal transmission in the control unit 140 may be included in the transmitting unit 110, and a functional unit related to signal reception in the control unit 140 may be included in the receiving unit 120.

<User Equipment 20>

Figure 6:
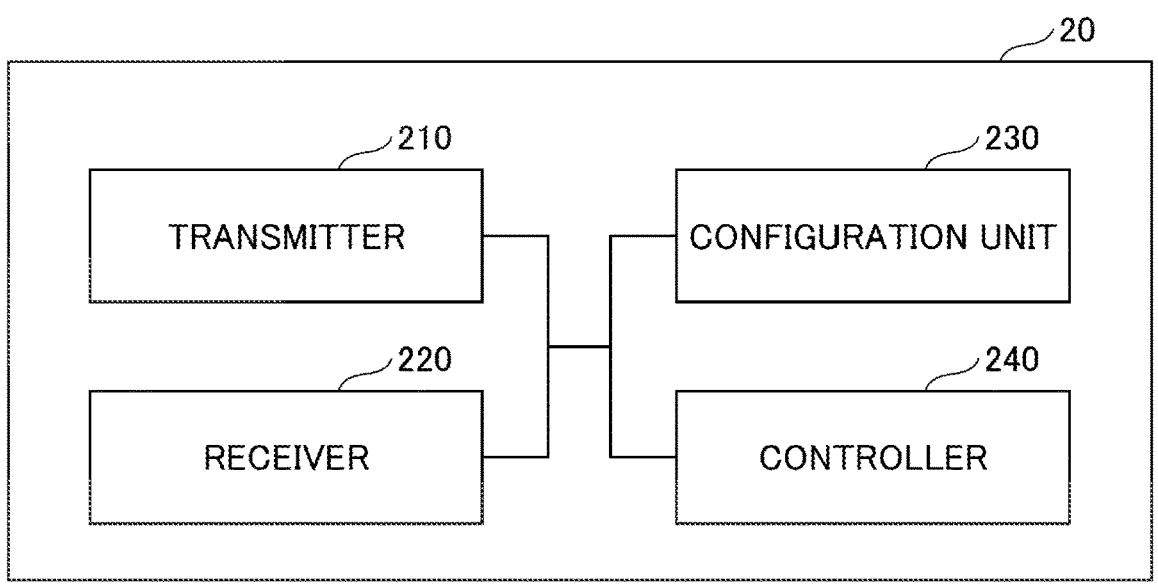
FIG. 6 is a diagram illustrating an example of a functional configuration of a user equipment 20 according to an embodiment of the present invention.

FIG. 6 is a diagram illustrating an example of a functional configuration of the user equipment 20. As illustrated in FIG. 6, the user equipment 20 includes a transmitting unit 210, a receiving unit 220, a configuration unit 230, and a control unit 240. The functional configuration illustrated in FIG. 6 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving the NR-PSS, the NR-SSS, the NR-PBCH, the DL/UL control signal, or the reference signal, transmitted from the network node 10.

The configuration unit 230 stores various types of configuration information received from the network node 10 by the receiving unit 220 in a storage device, and reads these pieces of information from the storage device as necessary. Furthermore, the configuration unit 230 also stores pre-configured configuration information. The content of the configuration information is, for example, information on a network slice that is allowed to be connected to.

As described in the embodiments, the control unit 240 performs processing related to an initial registration, a location registration, and a modification of a configuration. Furthermore, the control unit 240 performs processing related to connection control to a network and a network slice. A functional unit related to signal transmission in the control unit 240 may be included in the transmitting unit 210, and a functional unit related to signal reception in the control unit 240 may be included in the receiving unit 220.

(Hardware Configuration)

The block diagrams (FIGS. 5 and 6) used for describing the embodiments described above are of blocks of functional units. These functional blocks (components) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented in combination with software in one or more of the above-described devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, and so forth; however, the functions are not limited to these. For example, a function block (constituent unit) that implements the transmission function is referred to as a transmitting unit or a transmitter. In any case, as described above, the implementation method is not particularly limited.

Figure 7:
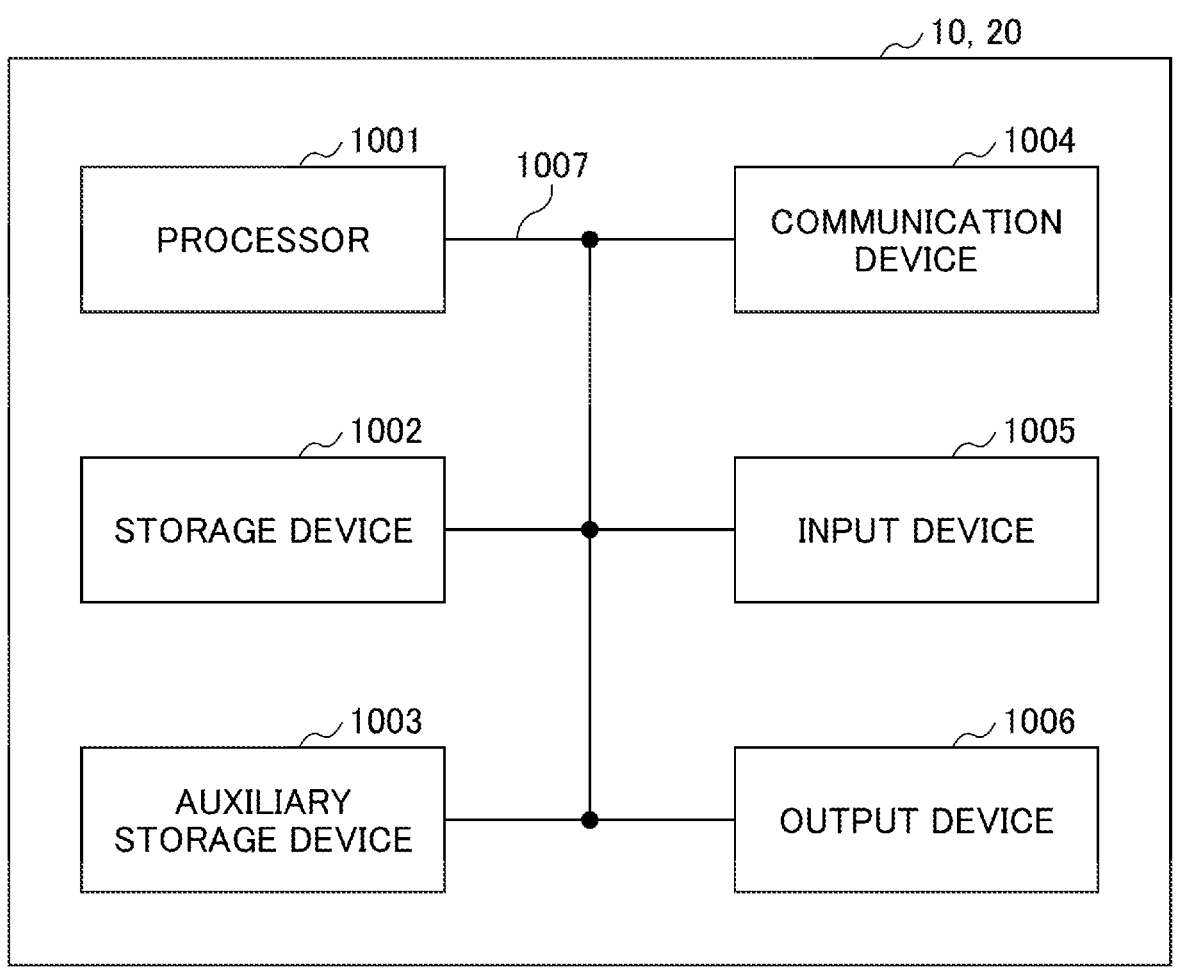
FIG. 7 is a diagram illustrating an example of a hardware configuration of the network node 10 or the user equipment 20 according to an embodiment of the present invention.

For example, the network node 10 and the user equipment 20 according to the embodiment of the present disclosure may function as a computer that performs processes of the radio communication method according to the present disclosure. FIG. 7 is a diagram illustrating an example of a hardware configuration of the network node 10 and the user equipment 20 according to the embodiment of the present disclosure. The network node 10 and the user equipment 20 described above may be formed as a computer apparatus physically including a processor 1001, a storage device 1002, an auxiliary storage device 1003, a communication device 1004, an input device 1005, an output device 1006, a bus 1007, and so forth.

Note that in the following description, the term "device" can be replaced with a circuit, a device, or a unit. The hardware configuration of the network node 10 and the user equipment 20 may be configured to include one or more devices illustrated in the figure, or may be configured to not include some of the devices.

The functions of the network node 10 and the user equipment 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140 and the control unit 240, etc., may be implemented by the processor 1001.

Furthermore, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the network node 10 illustrated in FIG. 5 may be implemented by a control program stored in the storage device 1002 and operating on the processor 1001. Furthermore, the control unit 240 of the user equipment 20 illustrated in FIG. 6 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a Read Only Memory (ROM), an Erasable Programmable ROM (EPROM), an Electrically Erasable Programmable ROM (EEPROM), and a Random Access Memory (RAM). The storage device 1002 may be referred to as a register, a cache, or a main memory. The storage device 1002 can store executable programs (program codes), software modules, and so forth for implementing the communication method according to the embodiment of the present disclosure.

The auxiliary storage device 1003 is a computer-readable recording medium, and may be formed of, for example, at least one of an optical disk such as a Compact Disc ROM (CD-ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD). For example, a transmission/reception antenna, an amplifier unit, a transmission/reception unit, and a transmission line interface, etc., may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor) that accepts input from the outside. The output device 1006 is an output device (for example, a display, a speaker, and an LED lamp) that performs output to the outside. Note that the input device 1005 and the output device 1006 may be integrated (for example, a touch panel).

Furthermore, the respective devices such as the processor 1001 and the storage device 1002 are connected by a bus 1007 for communicating information. The bus 1007 may be formed of a single bus or may be formed by using different buses between the devices.

Furthermore, the network node 10 and the user equipment 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

Conclusion of the Embodiments

As described above, according to the embodiments of the present invention, there is provided a network node including a receiver configured to receive, from a user equipment, a message requesting an initial registration or a location registration from a user equipment; and a transmitter configured to transmit a message to the user equipment when the user equipment is disallowed to connect to any one of one or more network slices, the message allowing the initial registration or the location registration including information related to a connection restriction that causes the user equipment to transition into a state in which the user equipment is registered and the user equipment is not allowed to use a service.

The configuration described above can prevent the UE 20 from starting to connect to the public network in the PLMN and to another PLMN, even if the UE 20 is disallowed to connect to the private network slice. That is, an operation to initiate a connection to a network by the user equipment can be controlled.

The network node may further include a controller configured to determine whether the user equipment is connectable only to a Closed Access Group (CAG) cell, and the transmitter may transmit, to the user equipment, the message allowing the initial registration or the location registration and that includes the information related to the connection restriction, when a result of the determination is that the user equipment is connectable only to the CAG cell and the user equipment is disallowed to connect to any one of the one or more network slices. The configuration can prevent the UE 20 from starting to connect to the public network in the PLMN and to another PLMN, when the UE 20 is allowed to connect only to the CAG cell and the UE 20 is disallowed to connect to any one of the one or more network slices.

The transmitter may include the information related to the connection restriction in a message that instructs a configuration update and may transmit the message that instructs the configuration update. This configuration can control a start operation of the UE 20 to connect to the network at any given timing, and thus is not limited to a timing of the initial registration or the location registration.

Furthermore, according to the embodiments of the present invention, there is provided a user equipment including a transmitter configured to transmit, to a network node, a message requesting an initial registration or a location registration to a network node; a receiver configured to receive, from the network node, a message allowing the initial registration or the location registration; and a controller configured not to attempt to connect to a network other than a network slice included in a registered network and the registered network when the message allowing the initial registration or the location registration includes information related to a connection restriction that causes the user equipment to transition to a state in which the user equipment is registered and the user equipment is disallowed to use a service.

The configuration described above can prevent the UE 20 from starting to connect to the public network in the PLMN and to another PLMN, even if the UE 20 is disallowed to connect to the private network slice. That is, an operation to initiate a connection to a network by the user equipment can be controlled.

Supplement of Embodiment

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the network node 10 and the user equipment 20 are described by using the functional block diagrams; however, such devices may be implemented in hardware, software, or combinations thereof. The software to be executed by the processor included in the network node 10 in accordance with the embodiment of the present invention and the software to be executed by the processor included in the user equipment 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this disclosure is applicable to at least one of LTE, LTE-A, SUPER 3G, IMT-Advanced, 4th generation mobile communication system (4G), 5th generation mobile communication system (5G), future radio access (FRA), New Radio (NR), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Furthermore, each aspect and embodiment described in this disclosure may be applied to a combination of a plurality of systems (for example, a combination of at least one of LTE and LTE-A, and 5G)

The processing procedures, the sequences, the flowcharts, and the like of the respective aspects/embodiments described in this specification may be reversed in order unless there is a contradiction. For example, the method described in this disclosure presents elements of various steps in an exemplary order and is not limited to a presented specific order.

In the present specification, a specific action that is supposed to be performed by the network node 10 may be performed by an upper node in some cases. In the network configured with one or a plurality of network nodes including the network node 10, various actions performed for communication with the user equipment 20 can be obviously performed by at least one of the network node 10 and any network node (for example, an MME or an S-GW is considered, but it is not limited thereto) other than the network node 10. The example in which the number of network nodes excluding the network node 10 is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes.

Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is called software, firmware, middleware, a microcode, a hardware description language, or any other name.

Furthermore, software, commands, information, or the like, may be transmitted and received via a transmission medium. For example, when software is transmitted from a web site, a server, or any other remote source using at least one of a wired technology (a coaxial cable, a fiber optic cable, a twisted pair, or a digital subscriber line (DSL)) and a wireless technology (infrared rays or a microwave), at least one of the wired technology and the wireless technology is included in a definition of a transmission medium.

Information, signals, and the like, described in the present disclosure may be indicated using any one of a variety of different techniques. For example, data, instructions, commands, information, signals, bits, symbols, chips, and the like, which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency," a "cell," or a "frequency carrier", or the like.

The terms "system" and "network" used in the present disclosure are used interchangeably.

Further, information, parameters, and the like described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH) and information elements can be identified by suitable names, the various names allocated to the various channels and the information elements are not limited in any respect.

In the present disclosure, the terms "base station," "radio base station," "base station apparatus," "fixed station," "Node B," "eNodeB (eNB)," "gNodeB (gNB)," "access point," "transmission point," "reception point," "transmission/reception point," "cell," "sector," "sector group," "carrier," "component carrier" can be used interchangeably. The base station is also referred to as a macro cell, a small cell, a Femto cell, a pico cell, and so forth.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station", "user terminal", "UE: User Equipment", and "terminal", and the like can be used interchangeably.

The mobile station is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, or the like. The mobile body may be a vehicle (for example, a car, an airplane), a mobile body that moves unmanned (for example, a drone, an automatically driven vehicle), or a robot (manned type or unmanned type). Note that at least one of the base station and the mobile station also includes a device which does not necessarily move during the communication operation. For example, at least one of the base station and the mobile station may be an Internet of Things (IoT) device such as a sensor.

Furthermore, the base station in the present disclosure may be replaced with a user terminal. For example, the communication between the base station and the user terminal is replaced with communication (for example, may be referred to as D2D (Device-to-Device), V2X (Vehicle-to-Everything)) between a plurality of user equipments 20, and each aspect/embodiment of the present disclosure may be applied to the configuration after replacement. In this case, the user equipment 20 may have the functions of the network node 10 described above. Furthermore, terms such as "uplink" and "downlink" may also be replaced with terms corresponding to inter-terminal communication (for example, "side"). For example, uplink channels, downlink channels, or the like may be replaced with side channels.

Similarly, the user terminal in the present disclosure may be replaced with a base station. In this case, the base station may include the functions of the above-described user terminal.

In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation. Furthermore, "determining (deciding)" may be replaced with "assuming", "expecting", and "considering".

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be replaced with "access". In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, any reference to elements with the names "first" and "second" used in the specification does not generally limit the number of elements or the order of the elements. These names can be used as a convenient method for distinguishing two or more elements in the disclosure. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include," "including," and modifications thereof are used, these terms are intended to be inclusive, similarly to the term "comprising". In addition, the term "or" used in the present disclosure does not mean exclusive OR.

In the present disclosure, if an article is added by translation, such as a, an, the, in English, the present disclosure may include a case where the noun following the article is plural.

In the present disclosure, the term "A and B are different" may mean "A and B are different from each other". Note that this term may mean "A and B are each different from C". Terms such as "separated", "coupled", etc., may also be interpreted in the same manner as "different".

Each aspect/embodiment described in the present disclosure may be used singly or in combination, or may be used by being switched in accordance with the execution. Furthermore, reporting of predetermined information (for example, reporting "being X") is not limited to being reporting explicitly; this may be done implicitly (for example, not reporting the predetermined information).

Note that the AMF in the present disclosure is an example of a network node. The PLMN is an example of a network. The "REGISTRATION REQUEST" is an example of a message for requesting an initial registration or a location registration. The "REGISTRATION ACCEPT" is an example of a message for permitting an initial registration or a location registration. "IE that suggests access to a public network is restricted and only access to a private network slice is allowed" is an example of the information about a connection restriction. 5GMM-REGISTERED.NON-ALLOWED-SERVICE is an example of the state of being registered and being not allowed to use a service. "CONFIGURATION UPDATE COMMAND" is an example of the message that instructs the configuration update.

Although the present disclosure has been described in detail, it is apparent to those skilled in the art that the present disclosure is not limited to the embodiments as described in the present disclosure. The present disclosure can be implemented as modifications and variations without departing from the sprit and scope of the present disclosure as defined in claims. Thus, the description in the present disclosure is intended for exemplary description and does not mean any restriction to the present disclosure.

This international patent application is based on and claims priority to Japanese Patent Application No. 2019-003834 filed on Jan. 11, 2019, and the entire content of Japanese Patent Application No. 2019-003834 is incorporated herein by reference.

LIST OF REFERENCE SYMBOLS 10 network node
110 transmitter
120 receiver
130 configuration unit
140 controller
20 user equipment
210 transmitter
220 receiver
230 configuration unit
240 controller
1001 processor
1002 storage device
1003 auxiliary storage device
1004 communication device
1005 input device
1006 output device

The invention claimed is:

1. A network node comprising:
a receiver configured to receive, from a user equipment, a message requesting an initial registration or a location registration;
a transmitter configured to transmit a message to the user equipment when the user equipment is disallowed to connect to any one of one or more network slices, the message allowing the initial registration or the location registration including information related to a connection restriction that causes the user equipment to transition to a state in which the user equipment is registered and the user equipment is not allowed to use a service; and a controller configured to determine whether the user equipment is connectable only to a Closed Access Group (CAG) cell, wherein, when a result of the determination is that the user equipment is connectable only to the CAG cell and the user equipment is disallowed to connect to any one of the one or more network slices, the transmitter transmits, to the user equipment, the message allowing the initial registration or the location registration and that includes the information related to the connection restriction.

2. A user equipment comprising:

a transmitter configured to transmit, to a network node, a message requesting an initial registration or a location registration;

a receiver configured to receive a message allowing an initial registration or a location registration from the network node; and a controller that does not attempt to connect to a network slice included in a registered network when the message allowing the initial registration or the location registration includes information related to a connection restriction that causes the user equipment to transition to a state in which the user equipment is registered and the user equipment is not allowed to use a service, wherein, when the network node determines that the user equipment is connectable only to the Closed Access Group (CAG) cell and that the user equipment is disallowed to connect to any one of the one or more network slices, the receiver receives the message allowing the initial registration or the location registration and that includes the information related to the connection restriction.

* * * * *